United States Patent [19]
Bourgeois et al.

[11] Patent Number: 5,859,520
[45] Date of Patent: Jan. 12, 1999

[54] CONTROL OF A BRUSHLESS MOTOR

[75] Inventors: Jean-Marie Bourgeois, Divonne Les Bains; Jean-Marie Charreton, Bouc Bel Air; Pierre Guillemin, Marseilles; Bruno Maurice, Eguilles, all of France

[73] Assignee: SGS-Thomson Microelectronics S.A., Saint Genis, France

[21] Appl. No.: 827,747

[22] Filed: Apr. 10, 1997

[30] Foreign Application Priority Data

Apr. 12, 1996 [FR] France ..................................... 96/04816

[51] Int. Cl.$^6$ ....................................................... H02P 5/28
[52] U.S. Cl. .......................... 318/805; 318/798; 318/771; 318/727; 318/254; 318/138; 318/439
[58] Field of Search ..................... 318/798, 815, 318/771, 727, 254, 138, 439

[56] References Cited

U.S. PATENT DOCUMENTS

| | | | |
|---|---|---|---|
| 4,654,566 | 3/1987 | Erdman | 318/254 |
| 5,172,036 | 12/1992 | Cameron | 318/138 |
| 5,216,343 | 6/1993 | Genheimer et al. | 318/568.18 |
| 5,343,127 | 8/1994 | Maiocchi | 318/254 |
| 5,397,972 | 3/1995 | Maiocchi | 318/439 |
| 5,631,999 | 5/1997 | Dinsmore | 318/254 X |

OTHER PUBLICATIONS

French Search Report from French Patent Application 96 04816, filed Apr. 12, 1996.
Patent Abstracts of Japan, vol. 17, No. 698 (E–1481), Dec. 20, 1993 & JP–A–05 236785 (Kikuchi Atsushi).
Machine Design, vol. 63, No. 23, Nov. 21, 1991, Cleveland US, pp. 71–75, L.A. Berardinis, "Good Motors Get Even Better".

*Primary Examiner*—Karen Masih
*Attorney, Agent, or Firm*—Wolf, Greenfield & Sacks, P.C.

[57] ABSTRACT

The invention provides a method for controlling a brushless motor, with windings connected in star ('wye') formation, including the steps of periodically applying a supply voltage between first and second windings, detecting the presence of a current in a third winding, and an instant of cessation of that current, monitoring the value of a back emf induced in the third winding and detecting a zero crossing point of the back emf, timing a predetermined delay from the zero crossing point, and after the end of the delay, applying the supply voltage to other windings. The invention also provides a method for use with motors having windings connected in delta formation.

24 Claims, 11 Drawing Sheets

CONTROL OF A BRUSHLESS MOTOR

BACKGROUND OF THE INVENTION

1. Field of the Invention

The invention relates to the control of brushless motors.

2. Discussion of the Related Art

FIG. 1 shows a cross-section of a typical brushless, DC motor. The motor includes a permanent magnet rotor 12 and a stator 14 having a number of windings (A, B, C shown in FIG. 2). The windings are each formed in a plurality of slots 18. The motor illustrated has the rotor 12 housed within the stator 14. The stator 14 may also be housed within the rotor 12. The invention applies indifferently to either configuration. The rotor 12 is permanently magnetized, and turns to align its own magnetic flux with one generated by the windings.

FIG. 2 shows an electrical schematic diagram of the stator of such an electric motor, and the supply control circuitry used. Often, such motors comprise three phases A, B, C. These may be connected in a star ('wye') configuration having a common node N (as in the figure), or in a delta configuration. The invention applies indifferently to either. For each winding, a pair of switches XSA, XGA; XSB, XGB; XSC, XGC connect the free end of the winding to supply Vs and ground GND voltages, respectively. The switches are typically power transistors. A reverse biased diode DSA, DGA; DSB, DGB; DSC, DGC is placed in parallel with each of these switches. These diodes are high power rectifiers, and serve to protect the windings against induced voltages exceeding the supply or ground voltage. The opening and closing of the switches may be controlled by a microcontroller. For motors driven by mains power, the supply voltage Vs may be +300V respective to ground GND.

As shown in FIG. 3, the switches are controlled through a sequence of steps. The diagram shows the voltage VA, VB, VC applied to each winding, relative to the common node N. Illustrated in the figure is the case of a motor having phases A, B, C, and controlled through six steps s1, s2, s3, s4, s5, s6 each corresponding to a particular magnetic flux pattern established in the motor. In each of these 6 steps, one of the phases A, B, C is off, and the other two are oppositely polarized. This sequence of steps is a 'bipolar' sequence, as the coils may be polarized both positively and negatively with respect to the common node N.

Referring again to FIG. 2, this means that one of the supply switches XSA, XSB, XSC and a non-corresponding one of ground switches XGA, XGB, XGC is closed during each of the steps. One of the windings will be unconnected (although still protected from overvoltages by the protection diodes.) The rotor will align its magnetic flux with that of the stator, and so will rotate synchronously with the stator flux, as it rotates due to the switching of the 6 steps.

If the rotor is already turning, its rotation will induce a back emf voltage in each of the windings of the motor. For a loaded motor, the back emf generated in a winding is approximately in phase with the current flowing in the same winding.

FIG. 4 shows the 6 steps in the voltage VA applied across winding A, the current IA through winding A, and the back emf BemfA generated in winding A by the rotor under load. The high inductance of the windings slows the switching on and off of current IA. The periods of increasing current and decreasing current are the energizing period (pe) and the de-energizing period (pd) respectively. Extending between the end td of each de-energizing period and the subsequent energizing period pe is a surveillance period pz, during which the back emf may be monitored. The back emf alternates in polarity, and passes through zero crossing points zc.

For mains powered motors, such as are commonly used to power domestic appliances, the bipolar DC power supply Vs is directly derived from the AC mains. The DC supply may thus have a value of around +300V relative to the ground voltage for a 230V mains AC supply. The voltage actually supplied to each of the windings of the motor is controlled by pulse width modulation (PWM) of the DC supply voltage. The frequency of the pulse width modulation signal is usually high compared to the rotational frequency of the motor, such about 10 kHz. This PWM periodically applies then disconnects the supply and ground voltages to the windings. The switches are controlled by a microcontroller as a function of the current needed to be supplied to the motor, both to ensure the switching between steps s1–s6, and PWM control.

During "off" periods between PWM "on" pulses, the motor is freewheeling; the kinetic energy of the motor as it turns is transformed into electrical energy by its rotation in a magnetic field. The motor does not slow down during these periods, as the high PWM frequency and the inertia of the motor and its load makes this change undetectable.

In order for the motor to function correctly, the flux existing in the stator must always be slightly in advance of the rotor, to continually pull the rotor forward. Also, when the flux in the stator is just behind the rotor it is advantageously of a polarity to repel the rotor, to aid rotation. However, the rotor movement and the flux rotation should never be allowed to get out of synchronization, as the rotor may stop turning, or in any case will become very inefficient. Therefore, to optimize the efficiency of the motor, the switching of the windings from one step to another must be controlled in accordance with the actual position of the rotor.

Solutions exist whereby a "self-commutating" mode of operation of the motor is used. This uses monitoring of the back emf generated in the windings, and more particularly, the zero crossing points zc of such back emf, to determine the position of the rotor at a particular time.

A permanent magnet brushless electric motor is classically started up by performing a sequence of steps s1–s6 onto the windings at appropriate step times. The motor operates synchronously, and may be accelerated by increasing the step frequency. When zero crossing events have been detected, the motor is turned to self-commutated mode.

U.S. Pat. No. 4,654,566 describes such a motor control system. The zero crossing information is then used to switch to the next step in the sequence.

The solution offered by this patent uses only an approximation of the back emf voltage, which is thus inherently inaccurate. A simulated common node N voltage is used, not the actual common node voltage. Circuitry required to perform this approximation requires a significant number of high accuracy resistors and capacitors, which are expensive. These components may need to have an accuracy better than ±1%. The PWM used to supply the motor induces a large amount of electrical noise, which must be filtered out. In order to work at many speeds, the time constant of the filter needs to be variable. This requires switching arrangements and more high accuracy components to effect the switching. The use of integrating filters introduces a significant delay in reacting to changes in the situation of the motor. Measurement of back emf suffers from noise due to the PWM, and other noise. The back emf is scaled by a divider, which results in a back emf signal that is very small. The signal/noise ratio is thus extremely poor.

During the de-energizing period pd, it is not possible to measure back emf, as a large current is flowing in the 'unconnected' winding. Therefore, the back emf measurement must be disabled during this period. The length of the de-energizing period is not constant, but depends on the motor, its speed and loading, and on any dissymmetry between the phases of the motor. Known solutions (U.S. Pat. Nos. 4,654,566; 5,172,036) either assume a fixed de-energizing period, or 'anticipate' the next zero crossing point from the timing of the previous zero crossing point. To be able to work under all conditions, the fixed de-energizing period must be longer than the longest possible actual de-energizing period. This reduces the length of the surveillance period td that back emf can be detected in, and so reduces the operational range of the circuit. Such a fixed period leads to a fixed maximum speed of rotation of the motor. The other known 'anticipate' solution also has drawbacks. Dissymmetries between the phases of the motor result in a time interval between zero crossing points which is not fixed. Therefore, the dissymmetries render the 'anticipation' of the zero crossing points ineffective.

SUMMARY OF THE INVENTION

In view of the foregoing, it is an object of the present invention to provide a circuit for the control of a brushless permanent magnet electric motor wherein the transition from one step to the next is determined by a zero crossing in the back emf in that same winding, the back emf measurement being immune from interference due to PWM switching, and other, electrical noise.

It is a further object of the present invention to provide such a circuit wherein zero crossing of the back emf is detectable over as wide a range as possible.

It is a further object of the present invention to provide such a circuit able to control the motor over a large range of rotational speeds.

It is a further object of the present invention to provide such a circuit without the need to modify operational parameters, such as filter time constants, during operation.

It is a further object of the present invention to provide such a circuit without the need for a large number of precision components.

It is a further object of the present invention to provide such a circuit without the need to rely on an approximated common node voltage.

It is a further object of the present invention to provide an electrical appliance containing a brushless motor which operates efficiently with reduced acoustic noise.

Accordingly, the invention provides a method for controlling a brushless motor having a plurality of windings each having a first end connected at a common node and each having a second end connectable to supply voltages. The method includes the steps of applying an upper supply voltage to the second end of each of a first subset of the windings, and applying a lower supply voltage to the second end of each of a second subset of the windings. The second end of at least one winding is disconnected from the supply voltages, and the supply voltage being applied to at least one of the first and second subsets is periodically interrupted. Then the presence of a current in the disconnected winding and the instant of cessation of that current is detected. Beginning at the instant of cessation, the value of a back emf induced in the disconnected winding is monitored and a zero crossing point of the back emf with respect to one of the upper and lower supply voltages is detected. A predetermined delay is timed from the detected zero crossing point and, after the end of the predetermined delay, the supply voltages are removed from the second ends of the first and second subsets of windings. The upper supply voltage is applied to the second end of each of a third subset of windings, and the lower supply voltage is applied to the second end of each of a fourth subset of windings. The second end of at least one winding remains unconnected to the supply voltages.

The invention also provides a method for controlling a brushless motor having a plurality of windings, with each winding having a first end and a second end, connected in delta formation with a plurality of nodes connectable to supply voltages. The method includes the steps of applying an upper supply voltage to each of a first subset of the nodes, and applying a lower supply voltage to each of a second subset of the nodes. At least one node is disconnected from the supply voltages, and the supply voltage being applied to at least one of the first and second subsets is periodically interrupted. The presence of a voltage at the disconnected node, caused by a new equilibrium of currents in the windings is then detected. Beginning at the instant of establishment of the new equilibrium of currents, the value of a back emf induced in the windings and present at the disconnected node is monitored, and a zero crossing point of the back emf with respect to one of the upper and lower supply voltages is detected. A predetermined delay is timed from the zero crossing point detected. After the end of the predetermined delay, the supply voltages are removed from the first and second subsets of the nodes, the upper supply voltage is applied to a third subset of the nodes, and the lower supply voltage is applied to a fourth subset of the nodes. At least one of the nodes is disconnected from the supply voltages.

In an illustrative embodiment of the invention, the method further includes the cyclic repetition of the steps of detecting, monitoring, timing, removing and applying.

In an illustrative embodiment of the invention, the detection steps are performed using a selected one of a plurality of comparison signals, the selection being carried out according to the windings contained in said first subset and said second subset.

In an illustrative embodiment of the invention, periodically interrupting the supply voltage comprises applying pulse width modulation In an illustrative embodiment of the invention, the detection steps are at instants when the pulse width modulation applied has caused at least one of the supply voltages to be disconnected.

In an illustrative embodiment of the invention, the predetermined delay is a predetermined fraction of the time taken to perform a preceding cycle of steps, this predetermined fraction being modifiable during operation of the motor.

The invention further provides a circuit for controlling a brushless permanent magnet motor having a plurality of windings each having a first end connected at a common node and each having a second end connectable directly to supply voltages by switches, such that each second end may be either connected to an upper supply voltage, connected to a lower supply voltage, or disconnected from the supply voltages. Each of the second ends is connectable with: clamping circuitry which produces a clamped voltage representing a voltage across the associated winding; a comparator receiving the clamped voltage on one input and a reference voltage on the other input; and a latch whose input is enabled by an enable signal, with the latch providing control signals for the circuit.

In an illustrative embodiment of the invention, the clamping circuitry and the comparator are duplicated for each winding, and an output signal from each comparator is connected to an input of a multiplexer, with the output of the multiplexer being connected to an input of the latch.

In an illustrative embodiment of the invention, the multiplexer can provide positive and inverted versions of the output signal of each comparator at its output.

In an illustrative embodiment of the invention, the output of the multiplexer directly provides an end of de-energizing signal.

In an illustrative embodiment of the invention, switching circuitry is provided to periodically interrupt at least one of the upper and lower supply voltages, and the enable signal is synchronized to this periodic interruption.

In an illustrative embodiment of the invention, further timer circuitry is included, which times a predetermined delay period, beginning at a selected transition of the contents of the latch, and at the end of which, the supply voltages are removed from certain windings and applied to further windings.

In an illustrative embodiment of the invention, a microprocessor is provided which controls the opening and closing of the switches, performs the timing of the delay period, determines the length of the delay period, performs selection of the output signal of the multiplexer and generates enable signals to the latch.

BRIEF DESCRIPTION OF THE DRAWINGS

A particular embodiment of the current invention will be described, by way of example, with reference to the accompanying diagrams, wherein:

FIGS. 5A-1, 5A-2, 5A-3 show a schematic diagram of a circuit for controlling a motor according to the invention, during certain time periods;

FIGS. 5B-1, 5B-2, 5B-3 show a schematic diagram of a circuit for controlling a motor according to the invention, during later time periods;

DETAILED DESCRIPTION

Although it will not be described in detail, the control signals generated to govern the operation of various circuit elements in the circuit of the invention are generated by a host microcontroller. This microcontroller receives power at a low voltage (e.g. 5V) from an auxiliary power supply. Typically, motors controlled according to the invention are driven from rectified mains AC voltage. An auxiliary low voltage power supply can be easily provided, supplied by the same mains voltage.

According to an aspect of the invention, a single circuit is provided enabling both the end of the de-energizing period pd and the zero crossing point zc of the back emf to be detected. Between these two events, in the surveillance period (designated pz in FIG. 4), the back emf generated by the rotor in each unconnected winding is monitored. In this way, no time is lost after de-energizing, and the operating range of the circuit is maximized.

Figure 4:
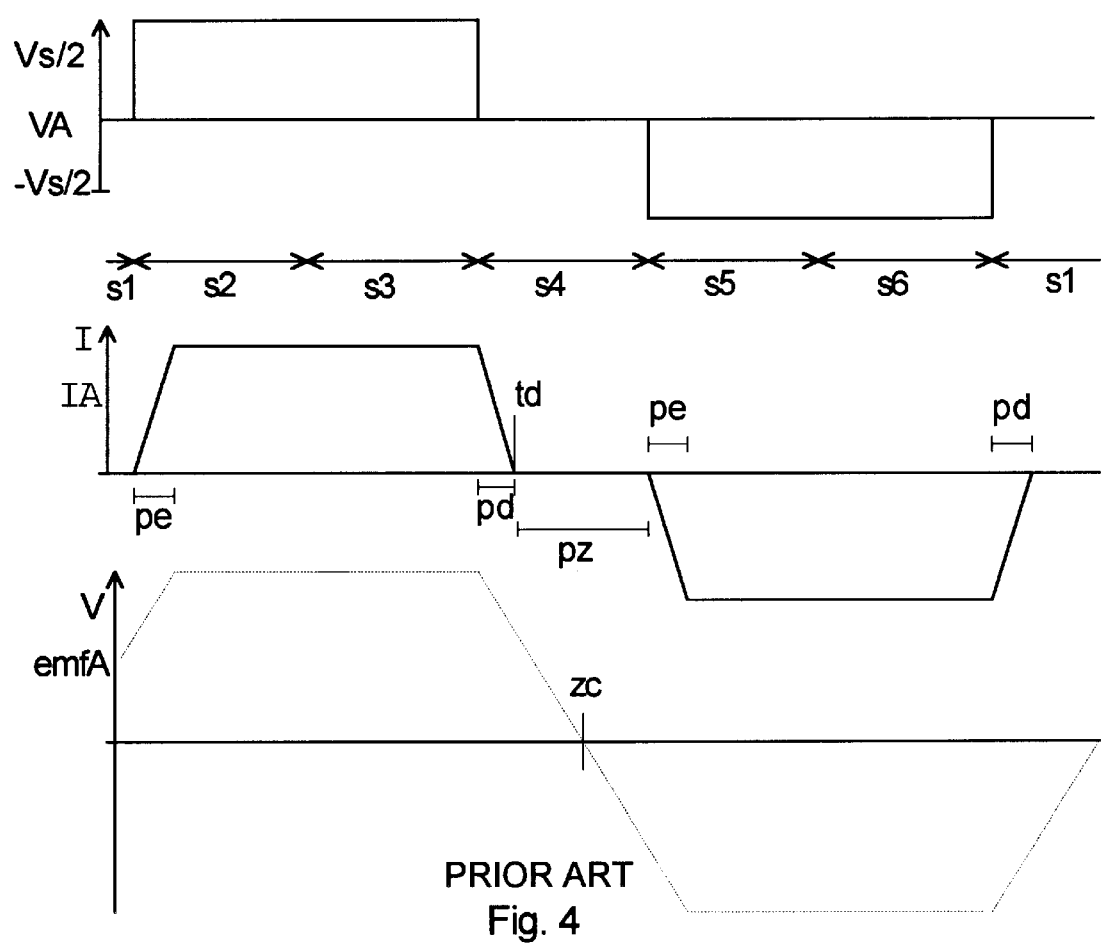
FIG. 4 shows currents and voltages in a winding of a motor.

When a zero crossing point zc of the back emf is detected, a delay is imposed from that point until the next step transition—at the beginning of s5 in FIG. 4. This variable delay is selected by the host microcontroller, using software, fuzzy logic or other methods, according to the instantaneous speed of the motor to achieve maximum efficiency and optimal torque of the motor.

Measurement of back emf is performed during "off" periods of the PWM, in order to ensure that no noise from the PWM switching interferes with the measurement. Advantage is thus taken of PWM switching to ensure regular, noise free back emf measurement.

The entire value of the back emf is used in the monitoring; no scaling down of the voltage is used, so the signal/noise ratio is significantly improved, itself improving the zero crossing point detection accuracy.

During a start-up phase, the motor is operated in synchronous mode. Control signals command switches XS, XG of FIG. 2 to perform the required steps s1–s6 in the correct order, and the rotor follows the rotating flux in the stator. At this time, the zero crossing points zc of the back emf may occur at any time in the step period, as there is no feedback to the motor control. The positions of the back emf zero crossing points zc will only vary slowly. After a short period of operation, the zero crossing points will drift into the surveillance period pz and be detected. Once this occurs, the self-commutating mode of operation of the invention is engaged. Due to dissymmetries in the motor, the zero crossing points for each phase may not all enter the surveillance period at the same time. For this reason, the self-commutating mode should only be engaged after a number of consecutive zero crossing points have occurred in the surveillance period, this number being at least equal to the number of windings of the motor. The consideration of these successive zero crossing points corresponds to filtering, and avoids reaction of the circuit to parasitic or random pulses which may occur during the start-up phase.

Control of the motor thus passes from a synchronous operation under start up conditions, where the motor flux configuration (the 6 steps) is controlled by a timer, to a self-commutating mode where the detection of the zero crossing point of back emf in a certain winding is used to time the turn on point of the current through the same winding.

This turn on point is at a delay of T/x after the corresponding zero crossing point, where T is the step period, and x is a constant, fixed to obtain the best possible operation of the motor. The step period T may vary, according to dissymmetries in the motor. The step period used to calculate T/x is that of the immediately preceding step. The constant x may be adjusted in real time to take account of variations in the mechanical loading of the motor, the required acceleration, required stability and efficiency.

A circuit for the measurement of the de-energizing period and back emf in the windings of the motor is shown in FIGS.

5A-1, 5A-2, 5A-3; 5B-1, 5B-2, 5B-3. Features common with FIG. 2 carry common reference labels.

Figure 1:
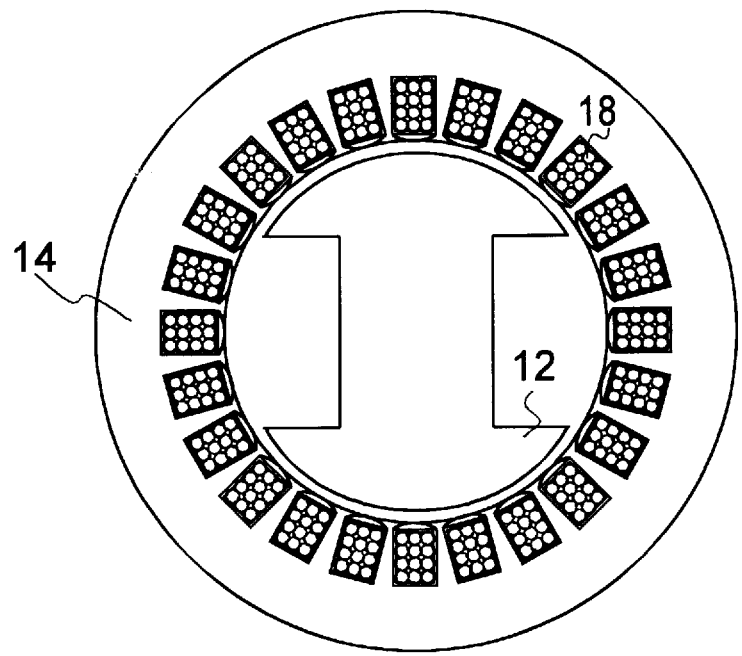
FIG. 1 shows a cross-section of a known brushless permanent magnet motor.
Figures 1, 5A:
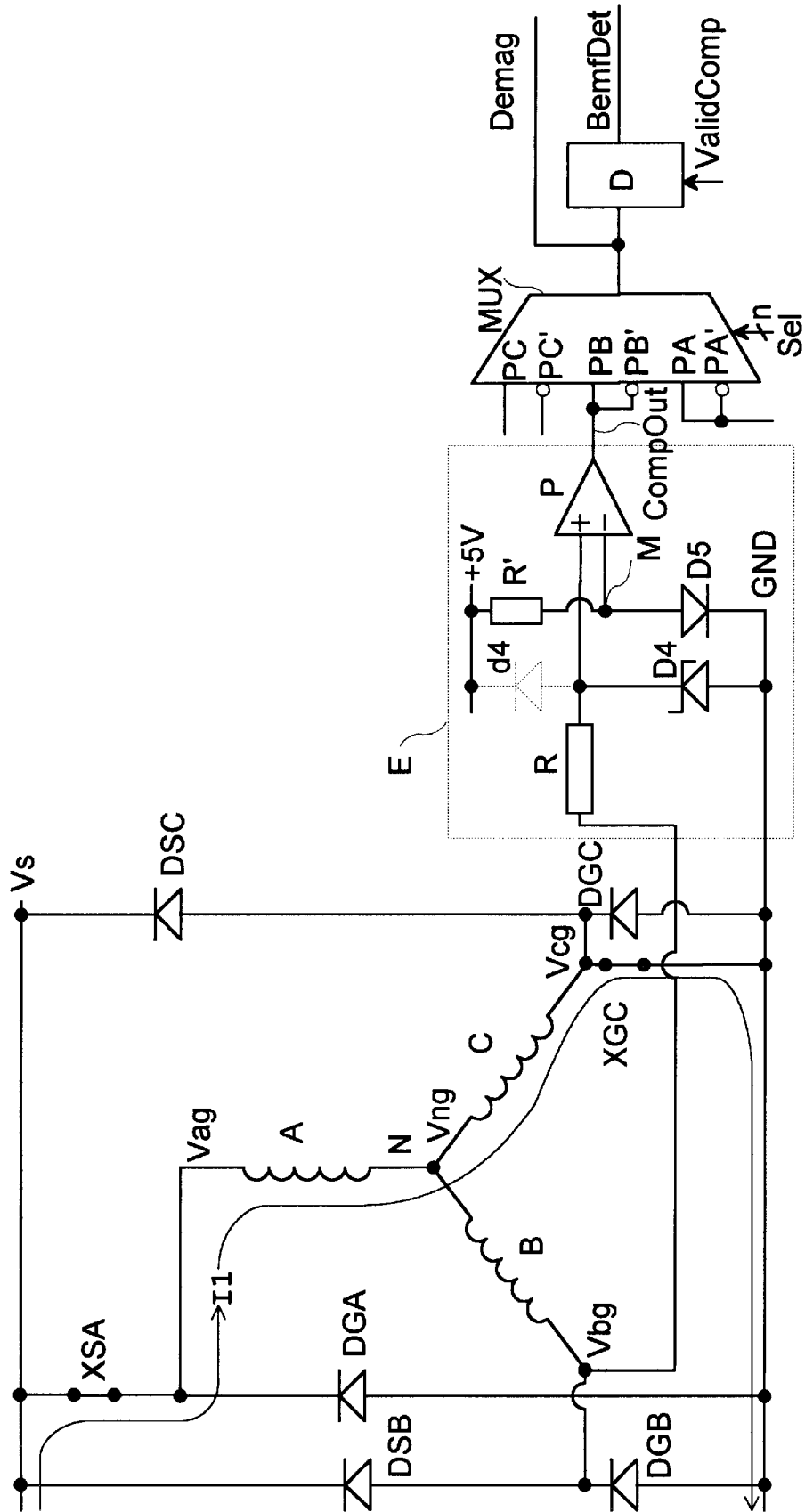
Figures 2, 5A:
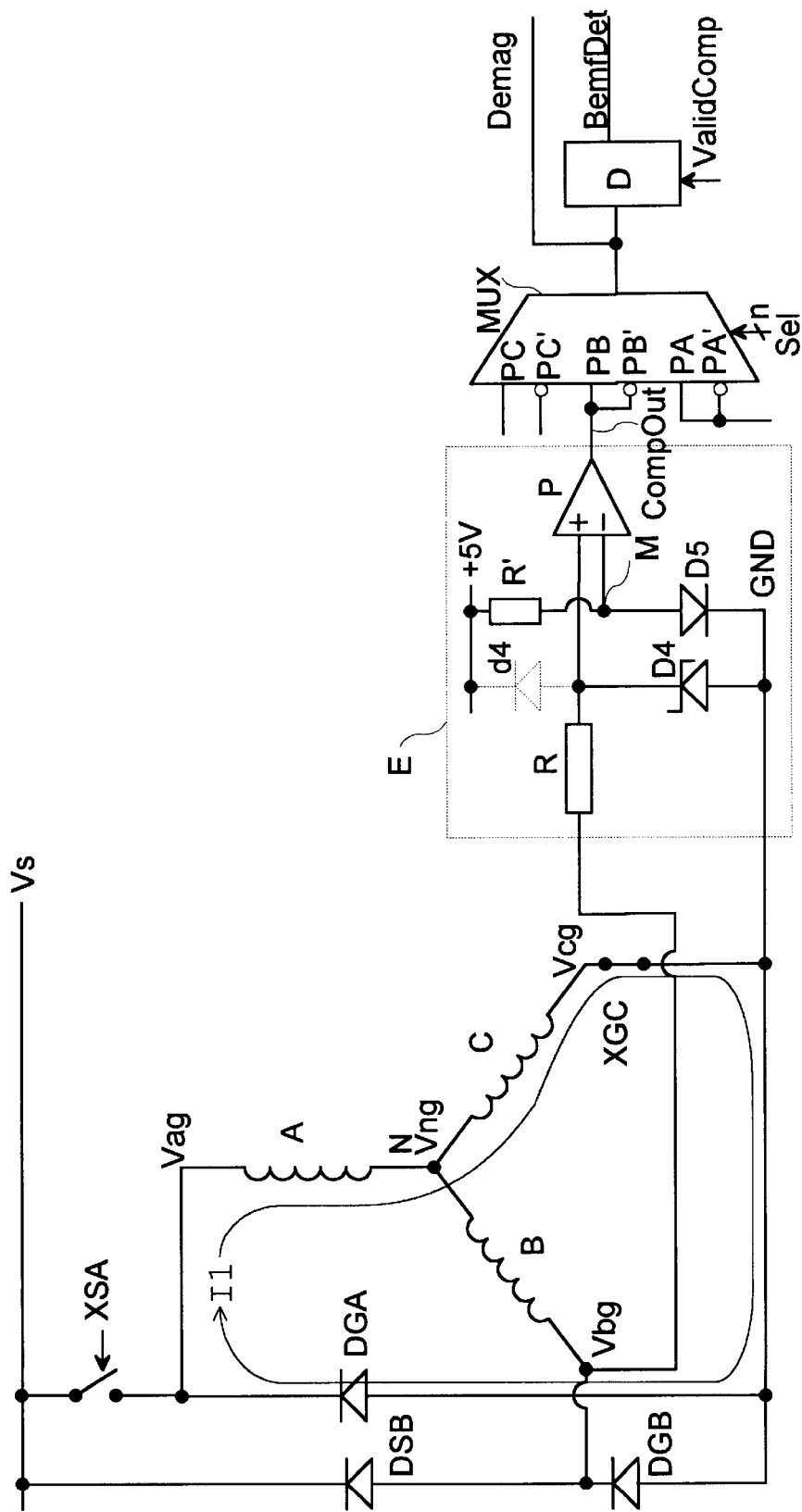
Figures 3, 5A:
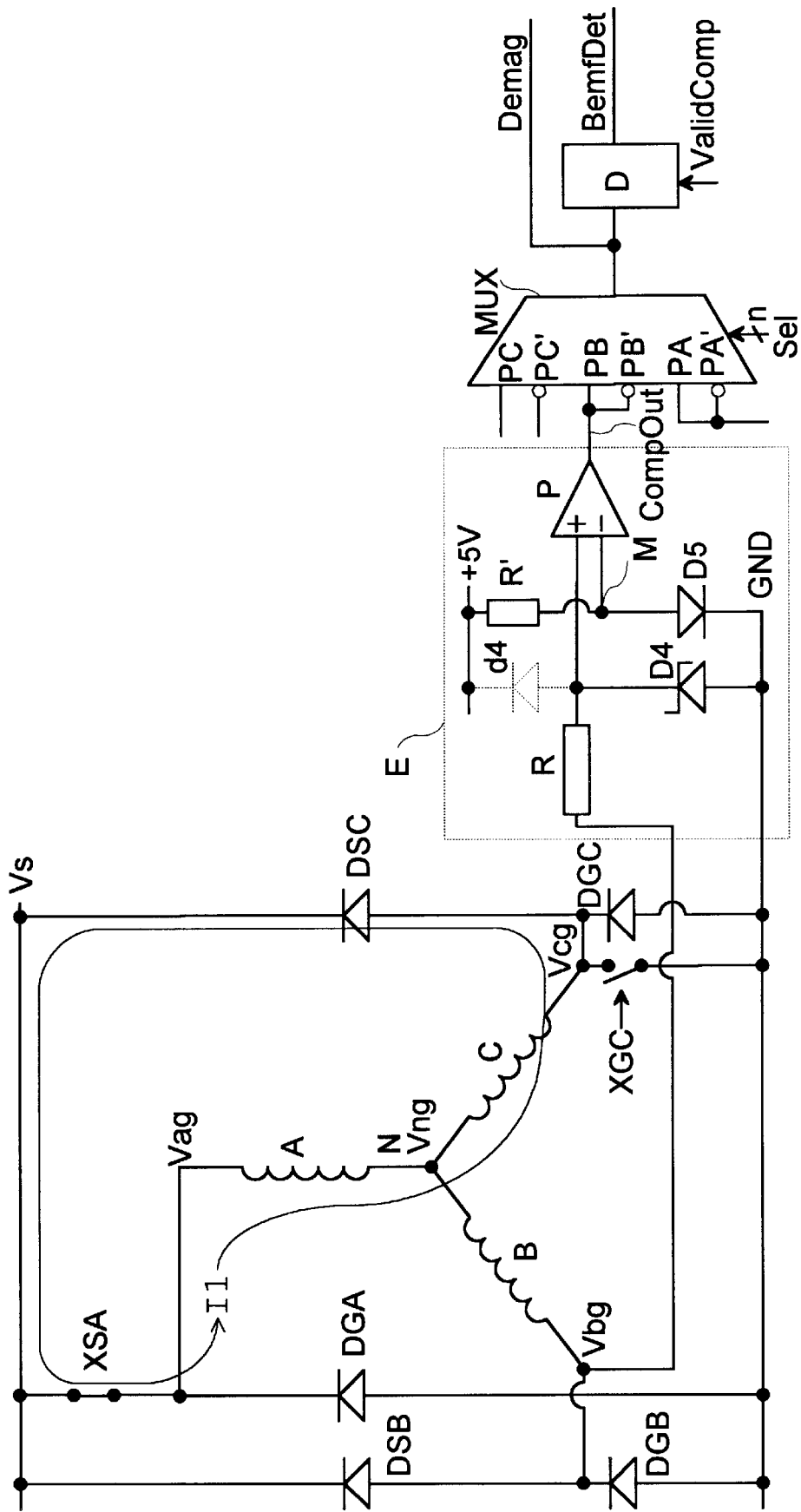

The circuit as shown in FIG. 5A-1 allows the measurement of the back emf in winding B. The windings A, B, C are connected in star ('wye') formation, with a common node N. The voltages at the free ends of windings A, B, C relative to the ground voltage GND will be referred to as Vag, Vbg, Vcg respectively. The voltage at the common node relative to the ground voltage will be referred to as Vng.

The free end of winding C is connected by switch XGC to ground GND. The free end of winding A is connected by switch XSA to supply voltage Vs. Diode DGA is connected between the free end of winding A and ground; diode DGC is connected between the end of winding C and ground; and diode DSC is connected between the end of winding C and the supply voltage Vs. The free end of winding B is connected by diode DSB to the supply voltage Vs and by diode DGB to the ground voltage GND. Switches XSA, XGC are alternately opened by PWM control.

Figure 2:
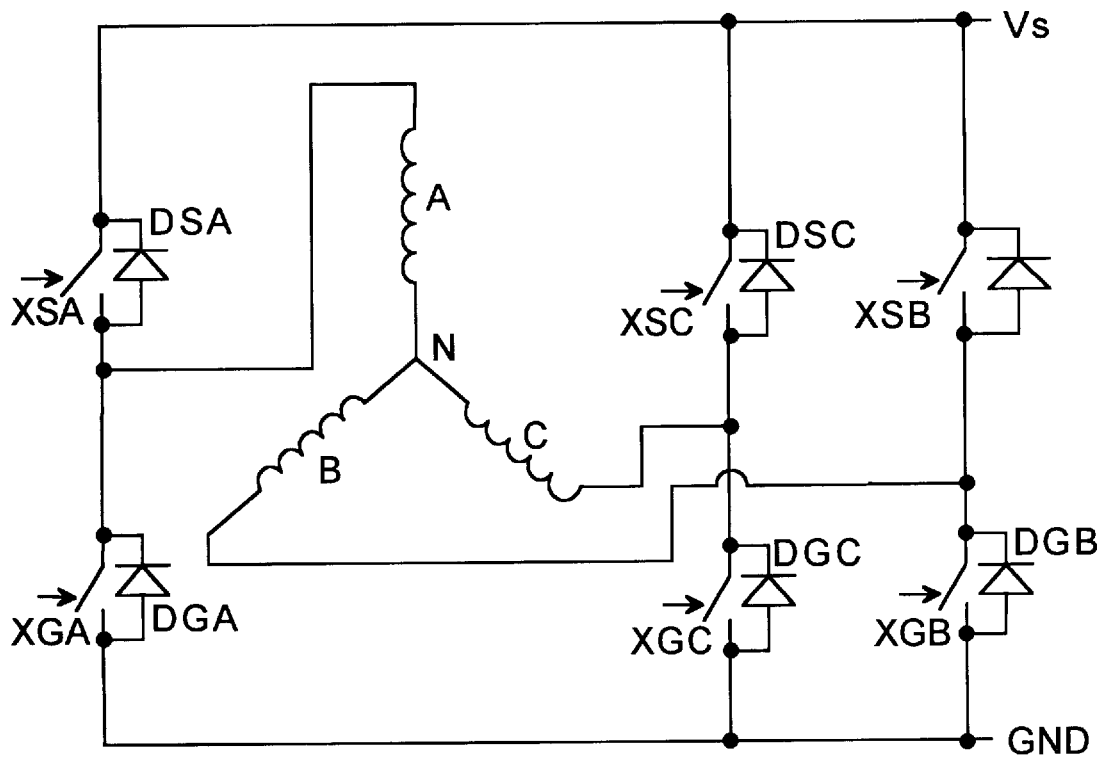
FIG. 2 shows a schematic diagram of a known circuit for controlling the motor of FIG. 1.

The features described are also shown in FIG. 2, and represent a particular configuration of the switches shown therein, corresponding to step s2. Only the switches and diodes relevant to the following description are illustrated.

A voltage comparator P has a non-inverting input connected via a resistor R to the free end of winding B, and to the ground voltage GND by a reverse biased avalanche diode D4. Alternatively, D4 may be replaced by a reverse biased diode d4 connected to the auxiliary +5V voltage supply. The comparator P also has an inverting input connected to a node M, between a resistor R' and a forward biased diode D5 connected respectively in series between the auxiliary +5V supply and ground. These elements form circuitry E, which is repeated three times, once for each winding. The outputs CompOut of all three comparators P are connected to pairs of inputs PA PA'; PB PB'; PC PC' of a multiplexer MUX. Alternatively, a single circuitry E may be provided, connectable by controlled switches to each of the windings A, B, C.

Figure 3:
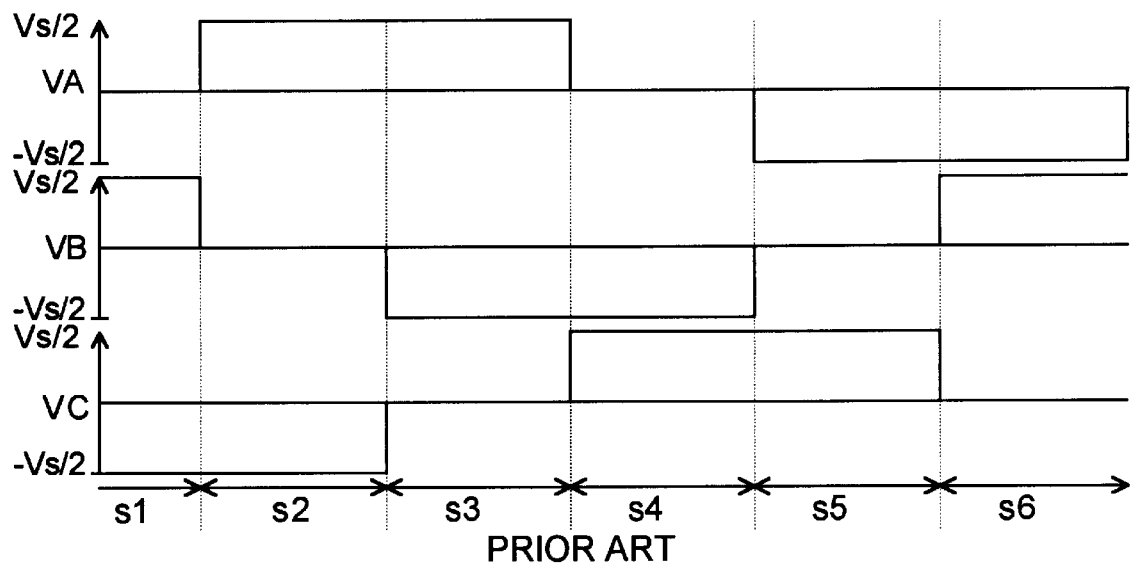
FIG. 3 shows voltages applied to parts of the circuit of FIG. 2.

In addition to pulse width modulation, the step control sequence described with reference to FIG. 3 is applied to switches XS and XG. That sequence is equivalent to rotating the three windings A, B, C shown in FIG. 5A-1 about the common node N, and using only one circuitry E.

The multiplexer has a number of inverting and non-inverting inputs. The output of each comparator P is connected to one inverting input PB' and one non-inverting input PB. Selection of which input is propagated to the multiplexer output Demag is performed by the microcontroller, using a number n of select signals Sel. These select signals may be equal in number to the inputs of the multiplexer, or they may be binary encoded, for example. The output Demag of the multiplexer is connected to an input of latch D, controlled by an enable signal ValidComp. The output of the latch D is a back emf detection signal, BemfDet.

Resistor R has a high value, such as 100 kΩ, and avalanche diode D4 may have an avalanche voltage of 5.6V. Diodes d4, D5 are small signal diodes, which typically have a forward voltage of 0.6V, whereas the other diodes, DGA, DSB, DGB are power rectifiers, and have a typical forward voltage of 1V.

Figure 6A:
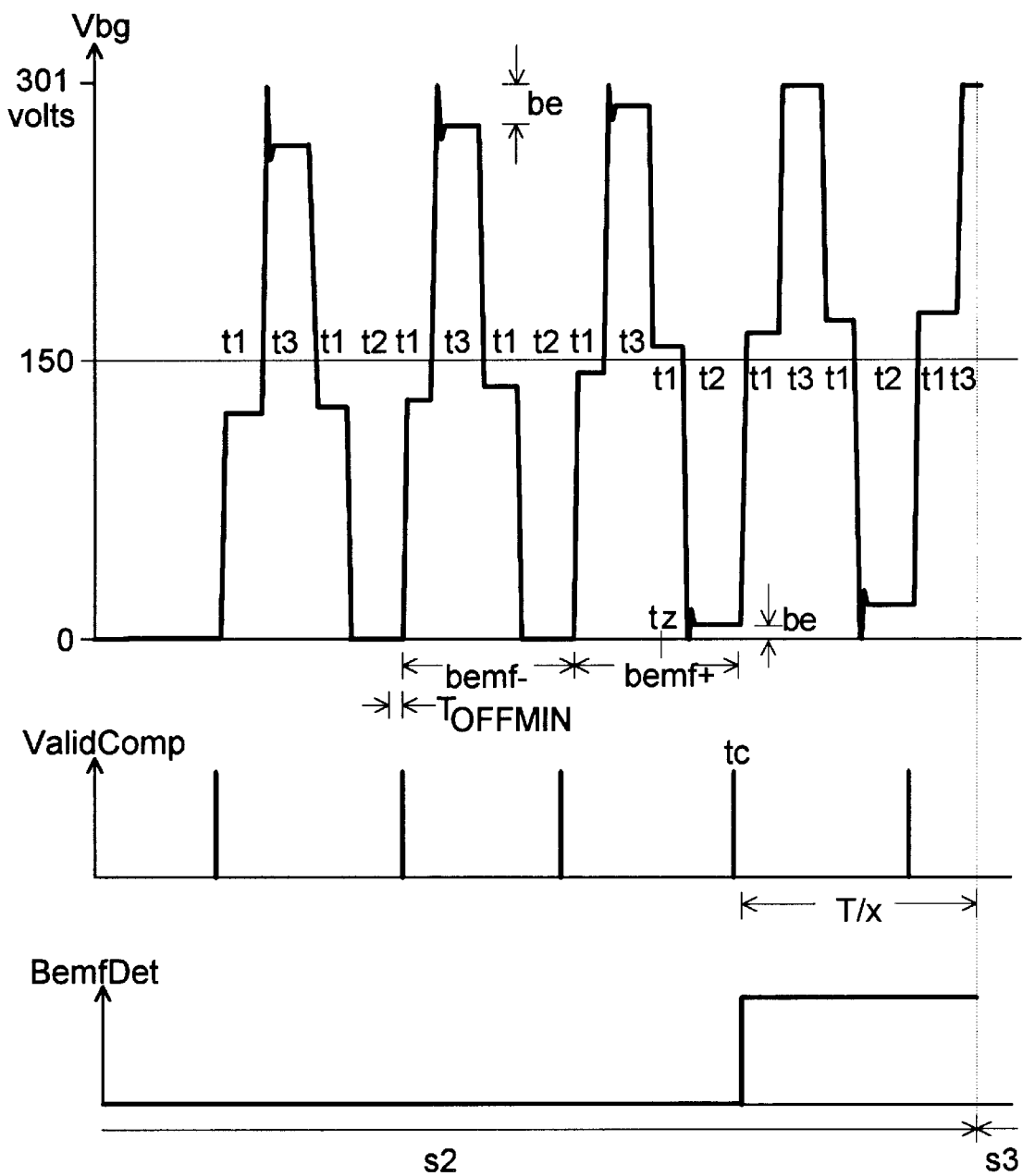
FIG. 6A shows voltages present in the circuit of FIGS. 5A-1, 5A-2 and 5A-3.
Figure 6B:
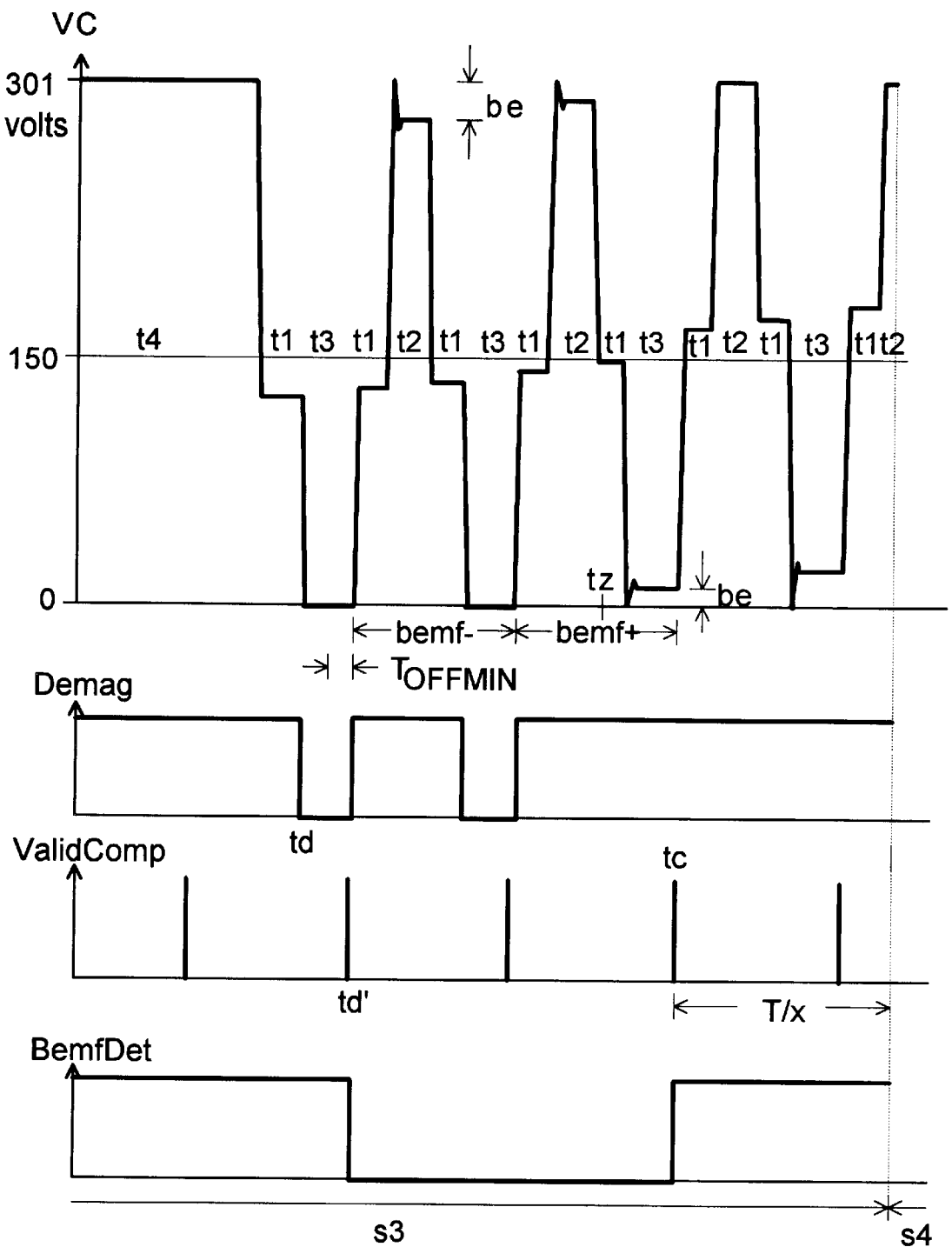
FIG. 6B shows voltages present in the circuit of FIGS. 5B-1, 5B-2 and 5B-3.

The FIG. 5A-1 shows the motor control circuit at an instant during a PWM "on" period within step s2, away from energizing or de-energizing periods. In the description of FIGS. 6A and 6B below, PWM "on" periods will be referred to as t1. Switches XSA, XGC are PWM controlled and in the instant shown, switch XSA applies supply voltage Vs (300V) to the free end of winding A, and switch XGC applies the ground voltage GND to the free end of winding C. Winding B is unconnected to either the 300V supply voltage Vs, or the ground voltage GND. Current I1 is flowing in windings A and C, but no current is flowing in winding B.

Node N voltage Vng is at approximately 150V, due to the voltage divider effect of windings A and C. As winding B is unconnected to either the 300V source, or the ground voltage, Vbg will also be around 150V. Only a very small current flows through resistor R; not enough to affect this voltage.

As shown in FIG. 5A-2, when switch XSA is opened, due to the operation of PWM control, the inductance of windings A and C maintains current I1 flowing, in the direction of the arrow shown. This current forward biases diode DGA, holding its forward voltage of about 1V between the free ends of windings C and A. This means that Vng will be about −0.5V. This is a "low voltage off" period, as the windings of the motor are all at around the ground voltage GND. In the description of FIGS. 6A and 6B below, "low voltage off" periods will later be referred to as t2.

As the motor is turning, a back emf is induced in winding B by the rotor, and this back emf appears at Vbg, offset by the −0.5V of Vng.

For the following PWM "on" period, switch XSA is closed again, and the circuit returns to the state shown in FIG. 5A-1.

For the following PWM "off" period, switch XGC opens. FIG. 5A-3 shows the motor control circuit at an instant during such a PWM "off" period, within step s2, away from energizing or de-energizing periods. The inductance of windings A and C maintains current I1 flowing, in the direction of the arrow shown. This current forward biases diode DSC, holding its forward voltage of about 1V between the free ends of windings C and A. This means that Vcg is at Vs+1V, or about 301V. Vag is at Vs (300V), and so Vng will be at a voltage of about 300.5V, due to the potential divider effect of windings A and C. The back emf induced in winding B, appears at Vbg, offset by the 300.5V of Vng. This is a "high voltage off" period, as the windings of the motor are all at around the supply voltage Vs. In the description of FIGS. 6A and 6B below, "high voltage off" periods will later be referred to as t3.

To detect back emf, and in particular the zero crossing points zc of back emf, a reference voltage needs to be defined for voltage comparison. The inverting input M of voltage comparator P is held at about 0.6V by the forward voltage of diode D5. Although Vbg varies between over 300V and negative values, the input to the comparator P is limited to vary between +0.6V and +5.6V by diodes D4 or d4, and D5, and resistor R. The voltage Vbg is clamped between −1V and +301V by diodes DGB, DSB. By comparing the voltage Vbg, which contains the back emf, with the +0.6V fixed by D5, the output CompOut of the comparator P gives a signal indicative of the polarity of the back emf in winding B. This signal is continually switching high and low as the supply and ground voltages Vs, GND are applied to windings A and C by the opening and closing of switches XSA, XGC.

The output Demag of multiplexer MUX supplies the Compout signal, as present at a selected input PA-PC, PA'-PC', to the input of latch D, which is clocked by enable signal ValidComp to record the polarity of the back emf each time that the signal ValidComp is at a high value. As discussed below, this high value occurs towards the end of alternate PWM "off" periods.

Selection among the inputs of the multiplexer is performed by the microcontroller, using select signals Sel, according to the step s1–s6, and so the winding which needs to be monitored to determine the next step switching time.

The circuit as shown may equally be used with delta connected motors, but the derivation of the actual back emf voltage in a winding is slightly more complicated.

FIG. 6A shows a typical voltage-time signal for the voltage Vbg at the free end of unconnected winding B of the motor, referenced to ground voltage GND, as in FIG. 5A-1. The time axis is magnified to enable visibility of the PWM control. The voltage Vbg remains at a mid range value during each PWM "on" period t1. Both diodes DGB, DSB are then non-conductive, and windings A and C act as a voltage divider. The voltage during these "on" periods is modulated by the back emf in winding B. A ValidComp signal for enabling the latch D and the output BemfDet of the latch D are also shown. The time period represented covers a step s2 and an adjacent portion of step s3.

The back emf is visible in voltage Vbg as an amount be, either subtracted from the peaks of "high voltage off" periods t3, when the ground voltage GND is disconnected (FIG. 5A-3), or added to the troughs of "low voltage off" periods t2, where the supply voltage Vs is disconnected (FIG. 5A-2), according to its polarity. During period bemf−, the back emf is negative, and the amount be is subtracted from the peaks of the voltage Vbg. It can be seen that during each PWM "off" transition–t1 to t2 or t1 to t3–, the voltage Vbg goes fully to the supply or ground level. This is due to the need to charge parasitic capacitance inherent in electric motors. The value be of the back emf can only be meaningfully measured at a trailing edge of a PWM "off" period. Since the control of the motor is performed by a microcontroller, the back emf measurement can be easily timed, because the microcontroller knows when the end of each "off" period will be.

At an instant tz, a back emf zero crossing occurs. After tz, the back emf is positive, and the amount be becomes added to the voltage Vbg during the "low voltage off" periods t2. Instant tz is thus the zero crossing point which needs to be detected.

As the two windings A and C are connected in series between the 300V supply voltage Vs and the ground voltage GND during PWM "on" periods, the voltage Vbg is then about 150V.

In systems controlled according to the invention a minimum PWM "off" period, TOFFMIN must be provided to allow sampling of the back emf.

Towards the end of TOFFMIN, a high value pulse is produced on ValidComp, enabling the result of a comparison performed by comparator P to be stored in latch D. This ValidComp signal is generated by the microcontroller according to the same timer that it uses to generate the PWM timing information. Thus, synchronization between the two signals is guaranteed.

Preferably, ValidComp signals are generated to enable back emf measurement only during "low voltage off" PWM periods t2. Symmetrical measurement of back emf could be performed during the "high voltage off" periods t3, but this is more difficult, as the voltage Vbg to be measured is at some 300V, rather than at about 0V during the "low voltage off" periods t2.

During the PWM period bemf−, the back emf has a negative value. This is seen in the subtraction of the back emf be from Vbg during the "high voltage off" periods t3. During the period bemf+, the back emf becomes positive, as shown by the addition of the back emf be to Vbg during the "low voltage off" periods t2. The back emf has crossed the zero value at around instant tz. The voltage at the non-inverting input of comparator P will be the voltage Vbg, as clamped by diodes D4, d4, D5. The comparator output CompOut goes high, and this is propagated by multiplexer MUX to its output Demag, at the input to latch D.

The positive back emf value is detected as a change in signal BemfDet when the next high value of the ValidComp signal occurs at time tc. Detection of zero crossing is thus performed to the next cycle of the PWM. For a 10 kHz PWM, this will introduce a maximum error of only 100 μs.

Timing of the period T/x begins at this moment. At the end of this period, switches XS, XG change state to switch to the next step s3. The back emf to be measured then appears on another winding, and the select signals Sel to the multiplexer MUX are changed accordingly. The period T/x can be adapted according to the speed of rotation of the motor.

Figures 1, 5B:
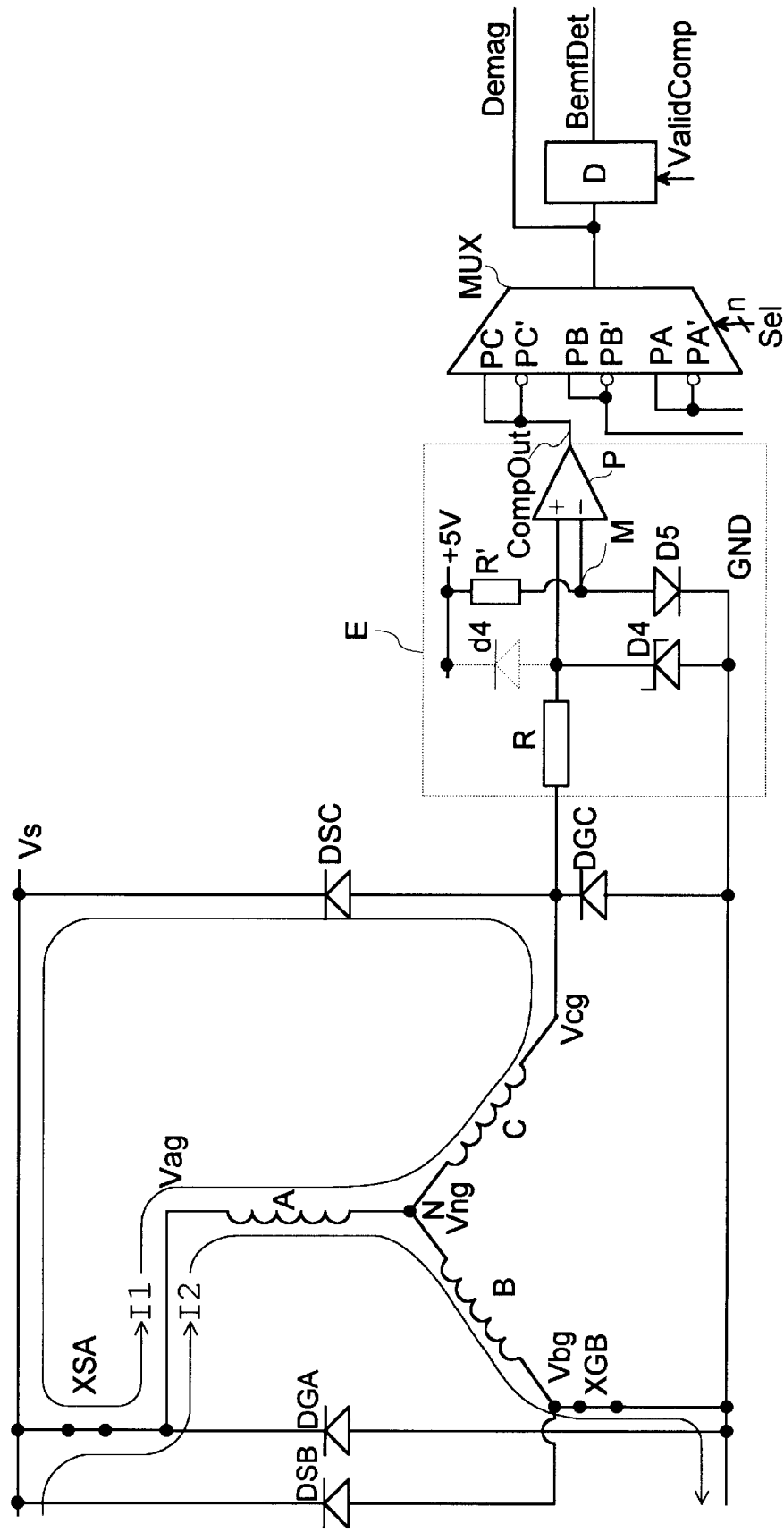
Figures 2, 5B:
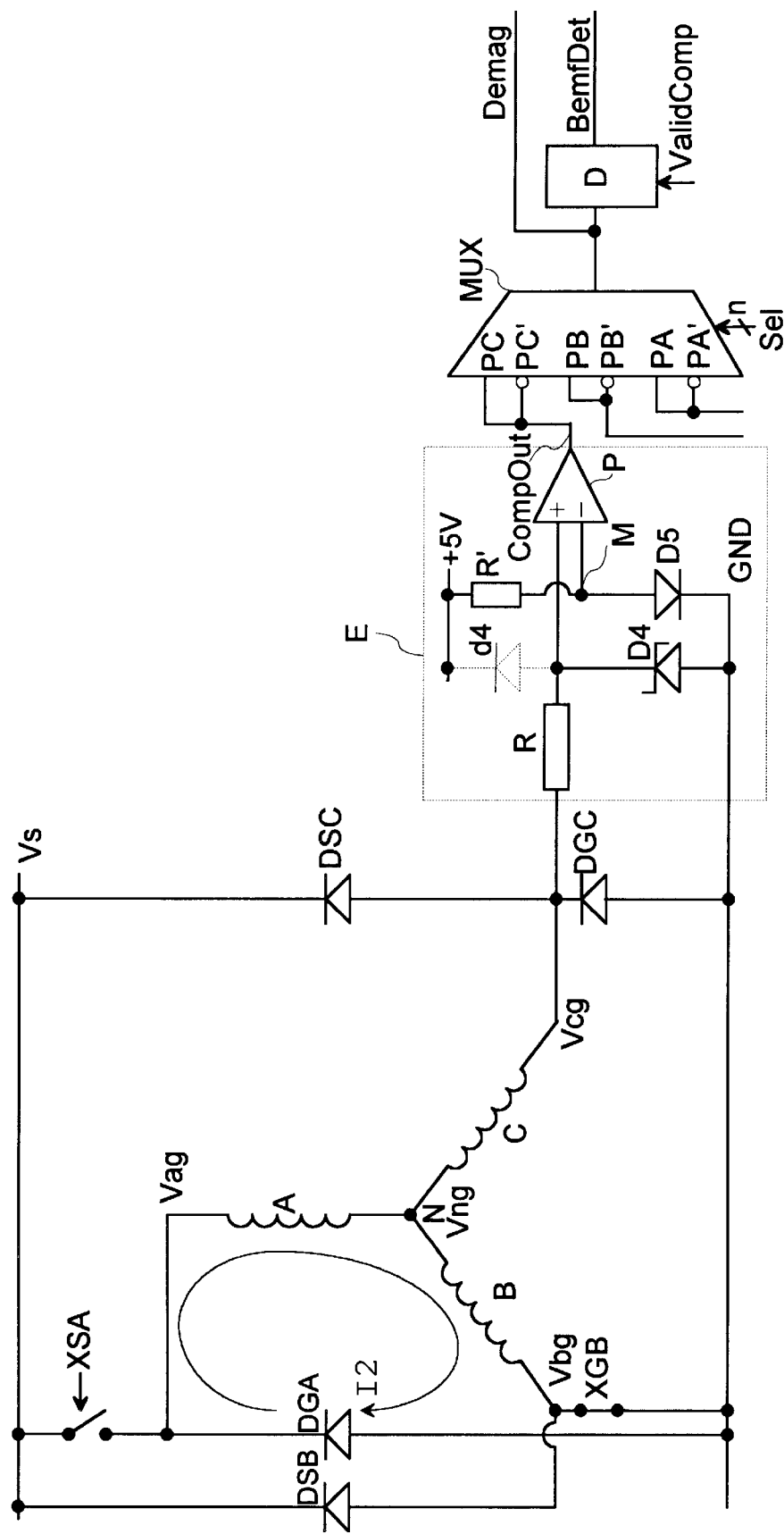
Figures 3, 5B:
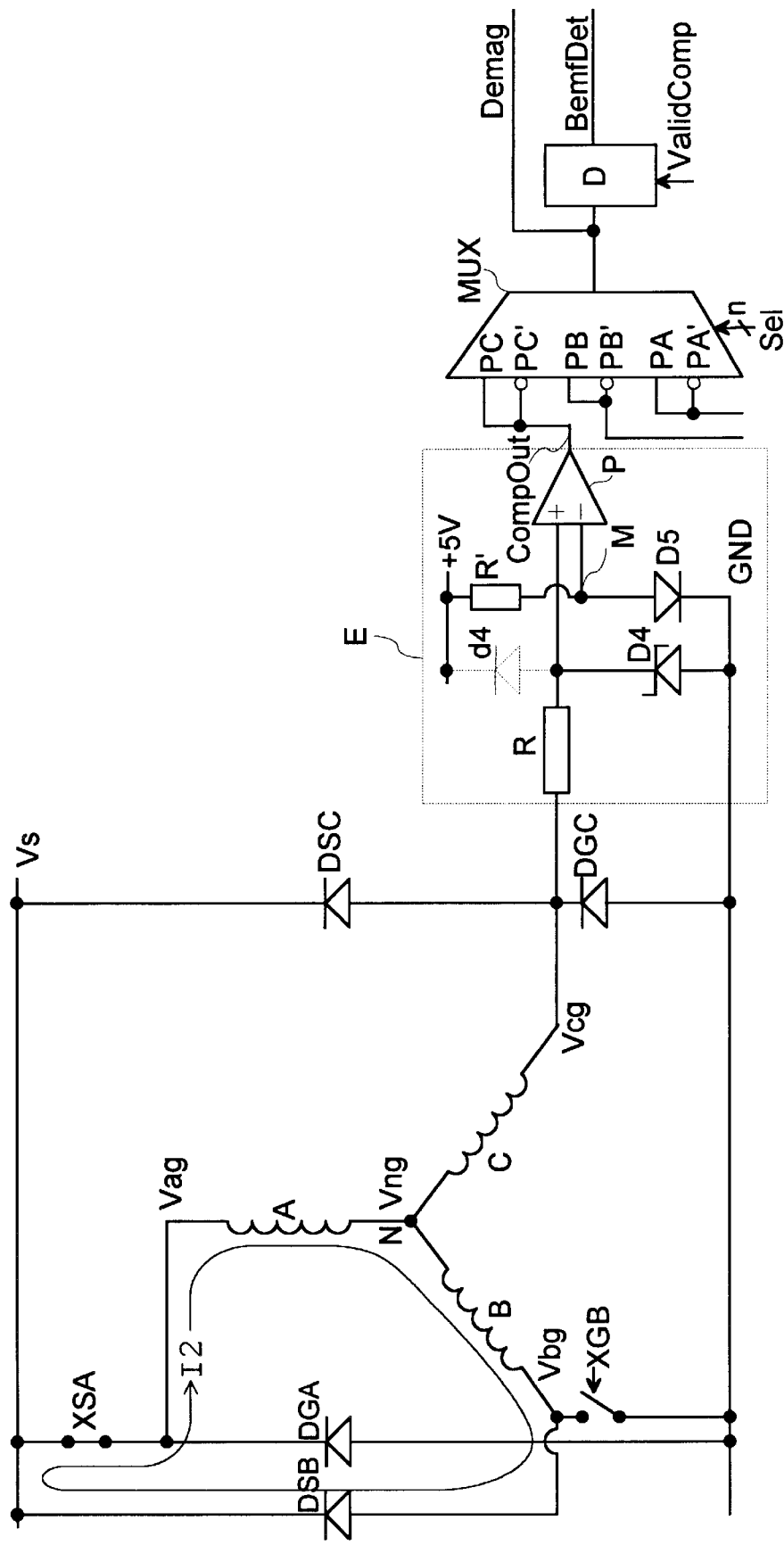

Referring to FIG. 5B-1, when step s3 begins, winding A remains connected to supply voltage Vs by PWM control of switch XSA, winding B becomes connected to ground GND by PWM control of switch XGB; winding C becomes disconnected from the supply and ground voltages Vs, GND. Select signals Sel activate the PC input of multiplexer MUX.

The current I1 previously circulating in winding C is maintained through diode DSC, switch XSA, winding A and node N, as described with reference to FIG. 5A-3, until all energy stocked in winding C is dissipated. This is the de-energizing period pd, discussed with reference to FIG. 4. The voltage Vcg is maintained at approximately 301V during this de-energizing period.

In addition, during PWM "on" periods t1, as shown in FIG. 5B-1, a current I2 flows from supply Vs, through switch XSA, winding A, node N, winding B, switch XGB to ground GND. The central node N voltage Vng will be approximately 150V, due to the voltage divider effect of windings A and C. While the energy previously stored in winding C is dissipating, more current (I1+I2) will be flowing through winding A than through winding B (I1) or winding C (I2). This may have the effect of raising the voltage Vng.

Referring to FIG. 5B-2, during a PWM "low voltage off" period t2, winding A becomes disconnected from supply voltage Vs by the opening of switch XSA. Due to the inductance of windings A and B, current I2 continues to circulate through winding A, node N, winding B, switch XGB and diode DGA. Diode DGA is forward biased, and maintains a voltage Vag of approximately −1V. Node N voltage Vng is at about −0.5V, due to the voltage divider effect of windings A and C.

The back emf induced in winding C by the turning rotor appears at Vcg, offset by the −0.5V of Vng.

During the next PWM "on" period t1, switch XSA closes, and the circuit returns to the state shown in FIG. 5B-1.

During the following PWM off period, and as shown in FIG. 5B-3, switch XGB opens, disconnecting winding B from the ground voltage GND. This represents a "high voltage off" PWM period t3. Due to the inductance of windings A and B, current I2 continues to circulate through winding A, node N, winding B and diode DSB. The forward voltage of diode DSB maintains the voltage Vbg at Vs+1V, or about 301V. Node N voltage is about 150V, due to the voltage divider effect of windings A and B.

FIG. 6B shows signals corresponding to those shown in FIG. 6A, for voltage Vcg, latch enabling signals ValidComp, and output BemfDet of Latch D, for the duration of step s3 and an adjoining portion of step s4. The multiplexer output signal Demag is also shown. The voltage Vcg is initially at about 301V, fixed by the supply voltage Vs plus the 1V forward drop of DSC, while current I1 is still flowing, and winding C is de-energizing. This corresponds to time period t4 in FIG. 6B. The output BemfDet of comparator P will be HIGH during this de-energizing period, as its non-inverting input will be held at about 5.6V by diode D4 or d4. High pulses on ValidComp during this period hold the output BemfDet of latch D at a high value. It is not possible to detect back emf values during this period. When the current I1 has finished circulating, and the de-energizing period pd is ended, the voltage Vcg will begin to follow the voltage Vng, offset by the back emf induced in the winding C. This instant indicates the end of the de-energizing period pd and the beginning of the surveillance period pz, on signal Demag at time td. It may be taken into account by the microcontroller in real time, and not in synchronization with pulses on ValidComp. This allows detection of zero crossing points to begin as early as possible. Also, at instant td', the first ValidComp pulse after the end of de-energizing, the output BemfDet of latch D goes low. This is the indication of the end of the de-energizing period pd, in synchronization with pulses on ValidComp. The back emf induced in winding C becomes visible during later "off" periods of PWM control during step s3, and zero crossing is detected in an identical way to that described with reference to FIGS. 5A-1 to 5A-3 and 6A. Active pulses on ValidComp may, if required, be generated only once per 2 or more pulse width modulation cycles. It is necessary to take into account the relative magnitudes of PWM frequency and phase switching frequency.

Following the zero crossing detection tc, another period T/x is timed, and when this elapses, switches XS and XG are controlled to begin step s4, connecting winding C to voltage Vs and winding B to GND. During this step, the voltage Vag goes to over 300V during PWM "high voltage on" periods, and about –0.5V during "low voltage off" periods. Back emf measurement is performed on winding A.

The signal-to-noise ratio of the back emf voltage to the PWM and switching noise is improved by working with the real (unfiltered, un-divided) back emf voltages, and by keeping the measurement really independent of the motor speed. No delays are introduced by any filtering of the signal. The voltage at the non-inverting input of comparator P is the voltage of the end of the unconnected winding, but clamped to be between +5.6V and +0.6V. The actual, undivided, unfiltered values of back emf are used in the zero crossing detection.

Two pieces of information are available from the outputs BemfDet and Demag of latch D. Falling edges td, td' each correspond to the time of the end of a de-energizing period pd, and rising edges tc correspond to the zero crossing detection of the back emf. The surveillance of zero crossing is engaged from the end td, td' of the de-energizing phase. Use of these two pieces of information allows the fastest possible control, by automatically adjusting to the characteristics and dissymmetries of the motor in question.

The magnitude of the back emf depends on the speed of the motor. As the circuit does not divide the back emf no matter what its magnitude is, the zero crossing is detected far more reliably, because the rate of change of the back emf seen by the comparator at zero crossing is the actual rate of change of the back emf. It is not divided, nor filtered, either of which would reduce the speed or accuracy of zero crossing detection.

Figure 7:
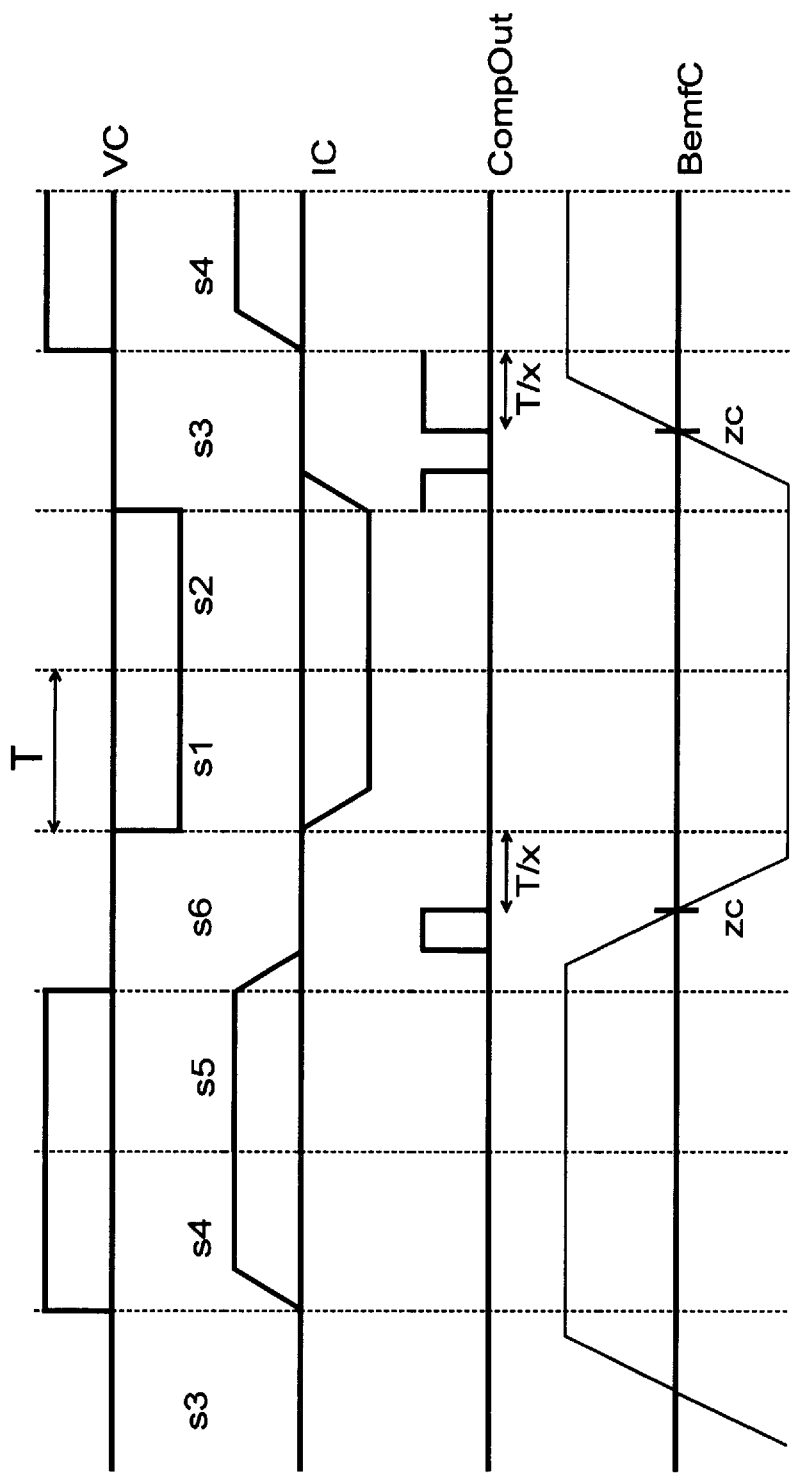
FIG. 7 shows voltages and currents used in a method of controlling an electric motor according to the invention.

FIG. 7 shows some of the relevant waveforms on a much longer timescale than FIGS. 6A or 6B. VC is the voltage applied across winding C, with reference to the central node N voltage Vng, and illustrates step period T. Although the voltage VC is shown as continuous, it is actually PWM controlled, as in FIG. 6B. IC represents the current flowing in winding C, a positive value indicating a current flowing towards the central node N. BemfC shows the back emf induced in winding C. As discussed earlier, this can be measured at every cycle, or every alternate cycle, of the PWM control. Thus, its value is continuously known. CompOut shows the output level of the comparator P of the selected circuit, at instants when ValidComp is high. CompOut is only shown during steps s6 and s3, where it indicates zero crossing points of back emf in winding C. During these steps, it will be selected by the Sel inputs to the multiplexer MUX. Outside these times, its value is of no importance. The change of state of BemfDet following the instant zc of zero crossing of the back emf is communicated to the microcontroller. From this point, the predetermined delay of T/x is timed by the microcontroller, and at the end of this delay, the switches XS and XG change state, to the next step in the sequence s1–s6. During steps s4, s5, switch XSC is closed, connecting winding C to the high voltage supply, causing current to flow. At the end of step s5, switch XSC is opened, and the voltage applied to the winding falls to zero. When the zero crossing point zc has been detected, and the delay T/x expired, the microprocessor closes switch XGC to connect winding C to the ground voltage to allow current to flow in the opposite direction, beginning step s1.

During steps s1, s2, switch XGC is closed, connecting winding C to the ground voltage, causing current to flow. At the end of step s2, switch XGC is opened, and the voltage applied to the winding returns to zero. When the zero crossing point zc has been detected, and the delay T/x expired, the microprocessor closes switch XSC to connect winding C to the supply voltage to allow current to flow in the opposite direction, beginning step s4.

As shown in signal CompOut, the polarity of the output signal of the comparator changes depending on whether a positive going zero crossing or a negative going zero crossing needs to be detected. Each of these zero crossings may be used to control one step transition during the cycle of steps. For this reason, the multiplexer of FIGS. 5A-1 to 5A-3 and 5B-1 to 5B-3 has an inverting input (P) and a non-inverting input (P') for each voltage comparator. By selecting input PC during step s3 and input PC' during step s6 (and similarly for the other inputs representing the back emf in other windings—PA during step s1, PA' during step s4, PB during step s5, PB' during step s2), the signal BemfDet always provides falling edges td' to indicate end of de-energization periods, and rising edges tc to indicate zero crossing points.

It is the negative going zero crossing of back emf in winding C that controls the transition from step s6 to s1, and the positive going zero crossing of back emf in winding C that controls the transition from step s3 to s4. Similarly, a positive zero crossing in winding B controls the transition from step s5 to s6, and a negative zero crossing controls the transition from step s2 to s3. A positive zero crossing in winding A controls the transition from step s1 to s2, and a negative zero crossing controls the transition from step s6 to s1.

The control method of the invention also has a speed adapting effect, in that the faster the motor turns, the earlier the back emf will cross the zero value, and so the phase voltage will be switched earlier which increases the efficiency of the motor.

The motor management method according to the invention will not be affected by mechanical or electrical dissymmetry in the motor. Since the control occurs in real time, the switching of the coil is carried out on the current cycle, and so is unaffected by any variation in step period T or PWM mark-space ratio.

The invention allows very precise motor control over a wide speed range. Variations in speed of 100:1 are possible.

The example described was for a star ('wye') connected motor. The same procedure may be used for controlling a delta connected motor.

The circuitry of the invention can be controlled with any simple microcontroller, such as for example one of the ST72xx or ST9xxx range of microcontrollers, manufactured by SGS-THOMSON Microelectronics.

The frequency of the pulse width modulation may be around 10 kHz, but this frequency has no bearing on the operation of the circuit, provided that the PWM frequency is significantly greater than the step frequency and high enough to reduce the acoustic noise caused by the switching of the coils.

The supply voltage of 300V described is often used for mains controlled motors operating from 220–250Vrms mains. The invention applies equally to use with motors at very different supply voltages, varying at least between 12V and 1200V.

Although described in relation to a motor having three windings, the method and circuit of the invention is easily adaptable to motors with fewer or more windings. Different step configurations than that illustrated herein are possible, along with the use of unipolar biasing to the windings, where each winding has its free end connected to one supply voltage by a reverse biased diode (DGA, DGB, DGC), and to the other supply voltage by a switch (XSA, XSB, XSC). PWM control may be effected by periodically disconnecting only one or other of the supply and ground voltages Vs, GND. Such applications remain within the scope of the invention.

Although described with reference to pulse width modulation control, the invention also applies to motors not controlled in such a way, provided always that periods TOFFMIN of interruption of current are provided to allow the required measurements to be made.

Although described with zero crossing detection carried out during every step, it is possible to reduce the number of detections. For example, it is possible to perform a single detection corresponding to one of the steps s1–s6, during each sequence of steps and then use memorized information for the other steps in the sequence. The memorized information is periodically refreshed.

Also, one could limit the measurement to positive going zero crossing or negative going zero crossing only, and derive information for other steps by symmetry.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for controlling a brushless motor having a plurality of windings, each having a first end connected to a common node and each having a second end connectable to supply voltages, comprising the steps of:

a) applying an upper supply voltage to said second end of each of a first subset of said windings, applying a lower supply voltage to said second end of each of a second subset of said windings, said second end of at least one winding being disconnected from said supply voltages and comprising a disconnected winding, said supply voltage applied to at least one of said first and said second subsets being periodically interrupted;

b) detecting a current in said disconnected winding and detecting an instant of cessation of said current in said disconnected winding;

c) monitoring a value of back emf voltage induced in said disconnected winding, said monitoring beginning at said instant of cessation of said current in said disconnected winding;

d) detecting a zero crossing point of said back emf voltage with respect to one of said upper and said lower supply voltages;

e) timing a predetermined delay from said zero crossing point detected; and f) removing said supply voltages from said second ends of said first and said second subsets of said windings at the end of said predetermined delay, then applying said upper supply voltage to said second end of each of a third subset of windings, applying said lower supply voltage to said second end of each of a fourth subset of windings, said second end of at least one winding remaining unconnected to said supply voltages.

2. A method for controlling a brushless motor having a plurality of windings, each having a first end and a second end connected in delta formation with a plurality of nodes connectable to supply voltages including the steps of:

a) applying an upper supply voltage to each of a first subset of said nodes, applying a lower supply voltage to each of a second subset of said nodes, at least one of said nodes being disconnected from said supply voltages comprising a disconnected node, said application of said supply voltage to at least one of said first and said second subsets of nodes being periodically interrupted;

b) detecting a voltage at said disconnected node, said voltage caused by a new equilibrium of currents in said windings;

c) monitoring a value of a back emf voltage induced in said windings and present at said disconnected node beginning at the instant of said new equilibrium of currents in said windings;

d) detecting a zero crossing point of said back emf voltage with respect to one of said upper and said lower supply voltages;

e) timing a predetermined delay from said zero crossing point detected; and f) removing said supply voltages from said first and second subsets of said nodes at the end of said predetermined delay, applying said upper supply voltage to a third subset of said nodes, applying said lower supply voltage to a fourth subset of said nodes, at least one of said nodes being disconnected from said supply voltages.

3. A method as claimed in claim 1 or claim 2, which further includes the cyclic repetition of steps b) to f).

4. A method as claimed in claim 1 or claim 2 wherein said detection steps in steps b), c) and d) are performed using a selected one of a plurality of comparison signals, said selection of one of a plurality of comparison signals carried out according to the windings contained in said first subset and said second subset, said comparison signals representing a voltage across an associated winding, and said comparison occurring between said comparison signal and a reference signal.

5. A method as claimed in claims 1 or 2, wherein periodically interrupting said supply voltage in step a) comprises applying pulse width modulation.

6. A method as claimed in claim 4, wherein said detection steps in steps b) and steps d) are performed at the instant when applying said pulse width modulation causes at least one of said supply voltages to be disconnected.

7. A method as claimed in claim 3, wherein said predetermined delay is a predetermined fraction of the time taken to perform a preceding cycle of steps b) to f), said predetermined fraction modifiable during operation of said motor.

8. A circuit for controlling a brushless permanent magnet motor comprising:
   a plurality of windings, each of said windings having a first end connected at a common node and each of said windings having a second end connectable directly to supply voltages by switches, said second end connected to an upper supply voltage or connected to a lower supply voltage or disconnected from said supply voltages;
   clamping circuitry connectable with said second ends, said clamping circuitry producing a clamped voltage, said clamped voltage representing a voltage across an associated winding;
   a comparator receiving said clamped voltage on one input and a reference voltage on another input, said comparator result indicating polarity of a back emf voltage in said associated winding; and
   a latch providing control signals for the circuit, an input of said latch enabled by an enable signal, an output of said latch comprising a back emf voltage detection signal,
   wherein said clamping circuitry and said comparator are duplicated for each of said windings, each of said comparators having an output signal connected to an input of a multiplexer, said multiplexer having an output signal connected to an input of said latch, wherein said multiplexer is connected to select a chosen one of inverted and non-inverted versions of said output signal of each of said comparators, said selected version of said output signal used as said multiplexer output.

9. A circuit as claimed in claim 8, wherein said clamping circuitry and said multiplexer directly provides an end of de-energizing signal, thereby signaling the beginning of back emf monitoring.

10. A circuit for controlling a brushless permanent magnet motor comprising:
   a plurality of windings, each of said windings having a first end connected at a common node and each of said windings having a second end connectable directly to supply voltages by switches, said second end connected to an upper supply voltage or connected to a lower supply voltage or disconnected from said supply voltages;
   clamping circuitry connectable with said second ends, said clamping circuitry producing a clamped voltage, said clamped voltage representing a voltage across an associated winding;
   a comparator receiving said clamped voltage on one input and a reference voltage on another input, said comparator result indicating polarity of a back emf voltage in said associated winding; and
   a latch providing control signals for the circuit, an input of said latch enabled by an enable signal, an output of said latch comprising a back emf voltage detection signal,
   wherein switching circuitry is provided to periodically interrupt at least one of said upper and said lower supply voltages, said enable signal synchronized to said periodic interruption.

11. A circuit for controlling a brushless permanent magnet motor comprising:
   a plurality of windings, each of said windings having a first end connected at a common node and each of said windings having a second end connectable directly to supply voltages by switches, said second end connected to an upper supply voltage or connected to a lower supply voltage or disconnected from said supply voltages;
   clamping circuitry connectable with said second ends, said clamping circuitry producing a clamped voltage, said clamped voltage representing a voltage across an associated winding;
   a comparator receiving said clamped voltage on one input and a reference voltage on another input, said comparator result indicating polarity of a back emf voltage in said associated winding;
   a latch providing control signals for the circuit, an input of said latch enabled by an enable signal, an output of said latch comprising a back emf voltage detection signal; and
   timer circuitry, said timer circuitry timing a predetermined delay period, said delay period beginning at a selected transition of contents of said latch, and at the end of said delay period, removing said supply voltages from certain windings and applying said supply voltages to further windings.

12. A circuit as claimed in claim 11, further comprising a microprocessor, said microprocessor controlling the opening and closing of said switches, said microprocessor performing said timing of said delay period, said microprocessor determining a length of said delay period, said microprocessor selecting said output signals of said multiplexer, and said microprocessor generating enable signals to said latch.

13. A circuit for controlling a brushless motor by measuring a back emf voltage comprising:
   a plurality of windings, each of said windings having a first end connected at a common node and each of said windings having a second end connectable directly to supply voltages by switches, said second end connected to an upper supply voltage or connected to a lower supply voltage or disconnected from said supply voltages;
   a single circuit detecting an end of a de-energizing period and detecting a zero crossing point of a back emf voltage to be detected, said circuit monitoring the back emf voltage generated by a rotor in each winding during a time between said end of said de-energizing period and said zero crossing point, said monitoring of back emf using an entire value of said back emf, said measurement of back emf performed during off periods of pulse width modulation control of a voltage supplied to each of said windings, said back emf voltage detected used to determine a position of a rotor to efficiently transition from one step to a next step when switching windings in said motor.

14. A circuit as claimed in claim 13, wherein said detection of back emf voltage is performed by a voltage comparator, said inverting input of said voltage comparator held at a reference voltage by a diode, and another input of said voltage comparator representing a voltage at an end of one of said plurality of windings, said voltage at an end of one of said plurality of windings clamped by diodes, and an output of said voltage comparator indicating a polarity of said back emf voltage in said windings and supplied to a latch to record said polarity of said back emf voltage.

15. A circuit as claimed in claim 13, wherein back emf voltage is unfiltered, undivided and independent of motor speed.

16. A circuit as claimed in claim 13, wherein said control automatically adjusts to characteristics and dissymmetries of said motor by detecting said de-energizing period and said zero crossing point.

17. A circuit as claimed in claim 14, wherein said zero crossing point is detected reliably by using said entire value of said back emf, wherein a rate of change of said back emf detected by said comparator at said zero crossing point is an actual rate of change of said back emf.

18. A circuit for controlling a brushless permanent magnet motor comprising:

a plurality of windings, each of said windings having a first end connected at a common node and each of said windings having a second end connectable directly to supply voltages by switches, said second end connected to an upper supply voltage or connected to a lower supply voltage or disconnected from said supply voltages;

clamping circuitry connectable with said second ends, said clamping circuitry producing a clamped voltage, said clamped voltage representing a voltage across an associated winding;

means for measuring actual back emf voltage connected to said clamping circuitry; and a latch providing control signals for the circuit, an input of said latch enabled by an enable signal, an output of said latch comprising a back emf voltage detection signal, said latch being connected to an output of said means for measuring actual back emf voltage, wherein a multiplexer is connected to select a chosen one of inverted and non-inverted versions of an output signal of said means for measuring actual back emf voltage, the selected version of said output signal used as said multiplexer output.

19. The circuit as claimed in claim 18, wherein said means includes a comparator receiving said clamped voltage on one input and a reference voltage on another input, said comparator result indicating polarity of said back emf voltage in said associated winding, said polarity used to determine a position of a rotor and to efficiently switch windings in said motor.

20. The circuit as claimed in claim 19, wherein said clamping circuitry and said comparator are duplicated for each of said windings, each of said comparators having an output signal connected to an input of said multiplexer, said multiplexer output connected to an input of said latch.

21. A circuit for controlling a brushless permanent magnet motor comprising:

a plurality of windings, each of said windings having a first end connected at a common node and each of said windings having a second end connectable directly to supply voltages by switches, said second end connected to an upper supply voltage or connected to a lower supply voltage or disconnected from said supply voltages;

clamping circuitry connectable with said second ends, said clamping circuitry producing a clamped voltage, said clamped voltage representing a voltage across an associated winding;

means for measuring actual back emf voltage connected to said clamping circuitry; and a latch providing control signals for the circuit, an input of said latch enabled by an enable signal, an output of said latch comprising a back emf voltage detection signal said latch being connected to an output of said means for measuring actual back emf voltage, wherein switching circuitry is provided to periodically interrupt at least one of said upper and said lower supply voltages, said enable signal synchronized to said periodic interruption.

22. A circuit as claimed in claim 18, further comprising timer circuitry, said timer circuitry timing a predetermined delay period, said delay period beginning at a selected transition of contents of said latch, and at the end of said delay period, removing said supply voltages from certain windings and applying said supply voltages to further windings.

23. A circuit as claimed in claim 22, further comprising a microprocessor, said microprocessor controlling the opening and closing of said switches, said microprocessor performing said timing of said delay period, said microprocessor determining a length of said delay period, said microprocessor selecting said output signals of said multiplexer, and said microprocessor generating enable signals to said latch.

24. A circuit as claimed in claim 23, wherein said output of said multiplexer directly provides an end of de-energizing signal, thereby signaling the beginning of back emf monitoring.

* * * * *